Patented Oct. 14, 1930

1,778,668

UNITED STATES PATENT OFFICE

TRUMAN S. FULLER, OF SCHENECTADY, NEW YORK, ASSIGNOR TO GENERAL ELECTRIC COMPANY, A CORPORATION OF NEW YORK

ELECTRODE

No Drawing.   Application filed June 30, 1927.   Serial No. 202,753.

My invention relates to electrodes and more particularly to electrodes for butt welding machines, spot welding and riveting machines and for line welding machines, for electric welding by the resistance process, and to electrodes for contactors and the like used principally for circuit closing purposes.

In the butt welding process the work to be welded is commonly clamped in work holding electrodes which lead the welding current into the parts to be welded. The electrodes are mounted so as to be relatively movable and pressure is applied to force together the parts of the work to be welded, which parts are heated and softened by the welding current. In the spot welding process the plates or other articles to be welded together are clamped between a pair of electrodes which exert a heavy pressure upon the work and conduct the welding current therethrough, the work, as in the butt welding process, being brought to a welding temperature by the heating effect of the current in the work. The parts of the work are brought into molecular union by the pressure exerted upon the electrodes. The electric riveting process is substantially the same as the spot welding process in that the rivet is softened by current led therethrough and it is then subjected to pressure applied to the electrodes. In the line welding process the welding current is conducted into the work by means of a pair of roller electrodes pressed against opposite sides of the work. The work and electrodes are moved relatively during welding to produce the line weld. In some cases but one roller electrode is used, a stationary mandrel or the like being substituted for the other electrode.

In all of the foregoing types of welding it is desirable that the electrodes have a relatively low resistance and good heat conductivity. Copper electrodes have long been used for the purpose but copper has a relatively low compressive strength and the surfaces of the electrodes become deformed with use, requiring relatively frequent redressing or replacement. Electrodes made of a copper tungsten mixture are now in very successful use for spot welding and riveting machines, but these electrodes are quite expensive.

In electric contactors and the like the circuit is made and broken between a pair of electrodes, and for certain classes of duty these electrodes are brought into engagement with high speed so that there is a heavy hammer blow effect when the circuit is closed. This is particularly true on contactors, oil switches and the like for heavy duty purposes.

An object of my invention is to provide an electrode of the class described which has good conductivity and is relatively hard and wear resistent and which will withstand relatively high pressure without deformation, which will withstand relatively hard blows without injury thereto, and which shall be relatively cheap to make.

Electrodes made in accordance with my invention comprise an alloy of copper silicon and an element such as nickel, cobalt or chromium. At present I prefer the copper-silicon-nickel alloy. It has heretofore been found that the alloy consisting of substantially 96% copper, .8% silicon and 3.2% nickel, when heat treated at about 930 deg. C. for about 2 hours and then quenched, as in water, and then reheated for about two hours at about 520 deg. C. and then either quenched or allowed to cool without quenching, is very hard and has a relatively low electrical resistance. The resistance of the alloy after the first heating and quenching is about 9.29 microhms per centimeter cube, but after the reheating the resistance is about 3.59 microhms. While this is somewhat higher than the resistance of copper, it is nevertheless satisfactorily low for my purposes. The heat treatment is carried out in substantially the same way where cobalt or chromium is substituted for the nickel. For a more detailed discussion of such alloys reference may be had to Korsunsky, British Patent 254,042; Corson, British Patent 256,457 and Corson, French Patent 606,274.

Where the copper-chrome-silicon alloy is used it is preferable to use about .15% silicon and .8% chromium. Where the copper-silicon-cobalt alloy is used it is preferable to use about .37% silicon and 1.4% cobalt.

All of the foregoing alloys are very hard and wear resistent and have good conductivity. The copper-silicon-nickel alloy, for example, has a Brinell hardness of about 125–175 compared with 40 for ordinary annealed copper. The material may be readily machined and will withstand a relatively high pressure without deformation. In order to prevent the electrodes of spot welding and riveting machines from becoming so hot during use as to be again rendered soft they should be water cooled by suitable means, examples of which are well known in the art. This expedient is unnecessary in butt welding machines as ordinarily constructed, although water cooling may be applied where desirable. Similarly, in line welding machines the electrodes should be cooled by suitable means, as for example by running water over the electrodes or directing streams of water against them. Such cooling means are well known in the art and form no part of my present invention.

Where the electrode is used to control an electric circuit, as in a contactor or switch, the arc, due to heavy duty service, may cause it to lose its hardness, and my electrode when applied to such service is preferably used under conditions in which the circuit is opened at some other point. Arrangements are now well known in which one switch is used to close a circuit and another to open the circuit, each switch being especially designed for its service. My electrode is particularly well adapted for circuit closing duty.

In spot welding and line welding machines, the circuit is usually broken by an automatically or manually operated circuit breaker so that the duty of breaking the circuit does not fall upon the electrode or electrodes which engage the work. In butt welding machines the electrodes do not have to control the circuit.

While the entire electrode, in accordance with my invention, may be made relatively cheap entirely of the alloy, it is apparent that in a contactor, for example, the contacting surface only may be made of the alloy, which surface may be a piece or block of the alloy secured in any suitable way to a backing or supporting member of other material. Similarly a roller electrode for line welding machine may have a rim or tire of alloy while the rest of the electrode is made of other material, such as copper for example. Electrodes for spot welding and riveting machines may be provided with a steel core extending part way through the electrode so as to reinforce it, but one of the advantages of my invention is that the material used is relatively inexpensive, thereby making it more economical in most cases to make the entire electrode of the alloy.

While I prefer to use the copper-silicon-nickel alloy, other elements such as chromium, cobalt or iron may be substituted for the nickel without departing from my invention which comprehends in its broader aspects any of the elements in a group consisting of nickel, chromium, cobalt and iron.

What I claim as new and desire to secure by Letters Patent of the United States, is:—

1. A pressure exerting electrode of the class described having a hard wear-resisting contact surface of an alloy of about 96% copper, about .8% silicon, and about 3.2% nickel.

2. A conducting pressure exerting electrode comprising an alloy of about 96% to 99% copper, about .8% to .15% silicon, and about 3.2% to .8% of a metal of a group consisting of nickel, chromium, cobalt and iron.

3. A pressure exerting electrode of the class described comprising an alloy of 96% copper, .8% silicon and 3.2% nickel, having a Brinell hardness of about 125–175 and a resistance of about 3–4 microhms per centimeter cube.

In witness whereof, I have hereunto set my hand this 29th day of June, 1927.

TRUMAN S. FULLER.